United States Patent [19]

Dahlin et al.

[11] Patent Number: 5,257,401
[45] Date of Patent: Oct. 26, 1993

[54] METHOD OF MAINTAINING AN ESTABLISHED CONNECTION IN A MOBILE RADIO SYSTEM COMPRISING BOTH ANALOG AND DIGITAL RADIO CHANNELS

[75] Inventors: Jan E. Åke S. Dahlin, Järfälla; Jan E. Uddenfeldt, Vällingby, both of Sweden

[73] Assignee: Telefonaktiebolaget L M Ericsson, Stockholm, Sweden

[21] Appl. No.: 507,469

[22] Filed: Apr. 11, 1990

Related U.S. Application Data

[63] Continuation-in-part of Ser. No. 371,126, Jun. 26, 1989, Pat. No. 5,042,082.

[30] Foreign Application Priority Data

Apr. 17, 1989 [SE] Sweden .......................... 8901385-8

[51] Int. Cl.$^5$ .................................... H04Q 7/00
[52] U.S. Cl. ................... 455/33.2; 455/54.1; 455/63; 375/5; 375/11; 375/101; 379/60
[58] Field of Search .......... 455/33, 34, 38, 44, 455/56, 67, 185, 33.2, 34.1, 38.1, 56.1, 676, 185.1, 63; 375/5, 11, 12, 14, 101; 370/95.1; 379/59, 60, 63

[56] References Cited

U.S. PATENT DOCUMENTS

| | | | |
|---|---|---|---|
| 4,355,401 | 10/1982 | Ikoma et al. | 375/5 |
| 4,694,468 | 9/1987 | Cullum | 375/101 |
| 4,748,685 | 5/1988 | Rozanski, Jr. | 375/5 |
| 4,765,753 | 8/1988 | Schmidt . | |
| 4,785,450 | 11/1988 | Bolgiano et al. | 379/59 |
| 4,797,947 | 1/1989 | Labedz | 375/5 |
| 4,852,086 | 7/1989 | Eastmond et al. | 375/5 |
| 4,928,100 | 5/1990 | Ardros et al. | 375/5 |
| 5,008,953 | 4/1991 | Dahlin et al. | 455/33 |

FOREIGN PATENT DOCUMENTS

| | | |
|---|---|---|
| 0219559 | 4/1987 | European Pat. Off. . |
| 0318033 | 5/1989 | European Pat. Off. . |
| 9014730 | 11/1990 | European Pat. Off. ........... 379/60 |

OTHER PUBLICATIONS

A. Baier et al., "Bit Synchronization and Timing Sensitivity in Adaptive Viterbi Equalizers for Narrowband-TDMA Digital Mobile Radio Systems", 38th IEEE Vehicle Technology Conference, Jun. 15-17, 1988.

Primary Examiner—Reinhard J. Eisenzopf
Assistant Examiner—Edward Urban
Attorney, Agent, or Firm—Burns, Doane, Swecker & Mathis

[57] ABSTRACT

The invention relates to a method in a mobile radio system having both digital and analog radio channels. An object of the invention is that a connection established on a digital radio channel often shall be possible to maintain even when the time dispersion on available digital radio channels exceeds the designed maximum time dispersion of equalizers in receiving stations. According the invention equalizers in the receivers of the system may be designed for a smaller maximum time dispersion than the total time dispersion the whole system shall be capable to handle. Instead handoff is made to an other channel when the time dispersion of a used digital channel tends to become too big. When an other digital radio channel with low time dispersion is available handoff is preferably done to this channel. Alternatively or in the absence of such a digital radio channel handoff is performed to an analog radio channel.

32 Claims, 6 Drawing Sheets

Fig. 3
| $RCH_a$ | ACH i |
| $RCH_b$ | ACH v |
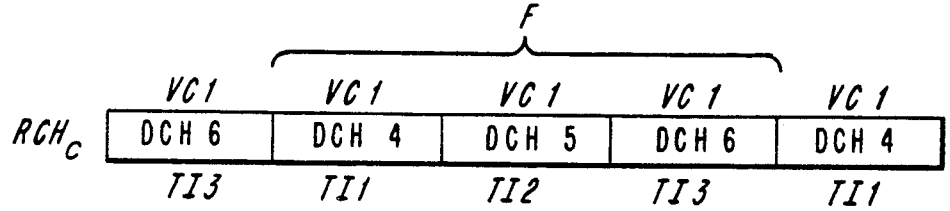
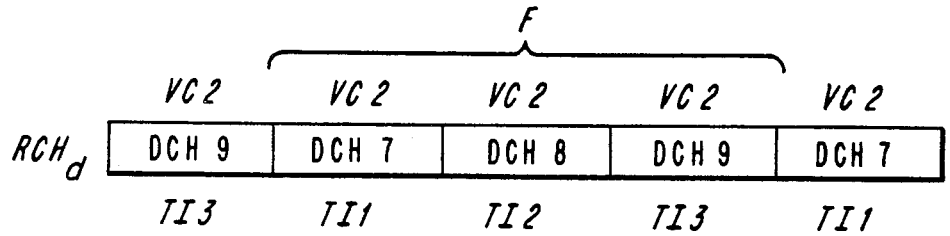
| $RCH_f$ | CC Hk |
| $RCH_g$ | CC Hr |

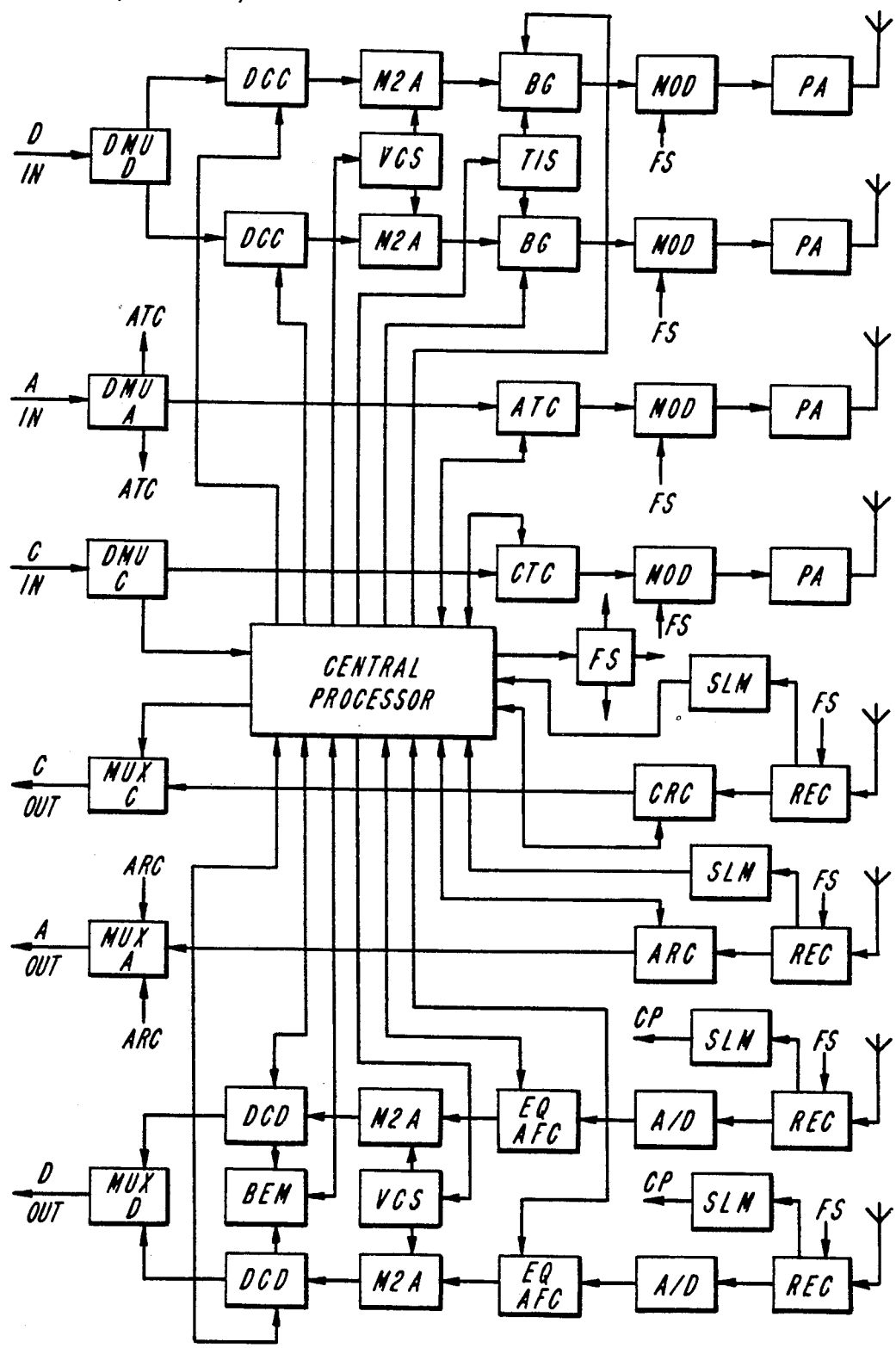

METHOD OF MAINTAINING AN ESTABLISHED CONNECTION IN A MOBILE RADIO SYSTEM COMPRISING BOTH ANALOG AND DIGITAL RADIO CHANNELS

This is a continuation-in-part of application Ser. No. 371,126, filed Jun. 26, 1989, now U.S. Pat. No. 5,042,082.

FIELD OF INVENTION

The present invention relates to the technical field of mobile radio systems. More specifically, the invention relates to a method in a mobile radio system having both analog and digital radio channels. The purpose of the invention is that a connection which has begun on a digital radio channel often shall be possible to sustain even when the dispersions on available digital radio channels exceed the maximum time dispersion for which the equalizers in the mobile stations have been designed. Due to its character the method might be referred to the technical field of handover in mobile radio systems.

BACKGROUND OF THE INVENTION

The mobile radio systems first in common use had analog transmission of information between base stations and mobile stations, i.e. analog information was transmitted between base and mobile stations by using analogouslymodulated radio signals on analog radio channels. By frequency multiplexing technique analog mobile radio systems may have plural radio channels. The Nordic mobile telephone system, NMT, is an example of such an analog mobile radio system having many radio channels.

Recently there has been suggested mobile radio systems with digital transmission of information between base stations and mobile stations, i.e. digital or digitized information is transmitted between base and mobile stations using digitally modulated radio signals on digital radio channels. Of course more radio channels may be created by frequency multiplex in digital mobile radio systems also. In order to get even more channels in digital mobile radio systems it has been proposed that digital radio channels shall share a radio frequency in time multiplex. The pan european mobile radio system, GSM, may be mentioned as an example of such a digital mobile radio system.

The digital technique means substantial advantages in mobile radio systems. Accordingly there is an interest in introducing the digital technique. On the other hand there are in certain areas existing analog mobile radio systems using the frequency band available for a digital system. When huge investments have been made in existing analog systems it is not always reasonable to immediately replace an existing analog system with a digital system. It has therefore been suggested to successively replace analog channels in analog systems having many analog channels in frequency multiplex by a number of digital channels in time multiplex. For the United States it has been suggested that each analog channel shall be replaced by three digital channels in time multiplex. During a long transitory period of time such a mobile radio system would then comprise both analog radio channels for analog transmission of information by using analog-modulated radio signals and digital radio channels for digital transmission of information by using digitally modulated radio signals. Mobile stations which during the transitory time wish to be able to use the full capacity of such a system must then be able to use both analog radio channels and digital radio channels.

In digital mobile radio systems problems occur with time dispersion on the digital radio channels due to reflections and multipath propagation unless particular measures are taken. The time dispersion changes from one place to the other due to the radio propagation properties. (Time dispersion problems have long been known in the fields of radio and television. For example, "ghosting" on a television screen is a result of time dispersion problems associated with receiving a broadcast signal and, after a time delay, receiving one or more reflections of that signal. In digital mobile radio systems, a plurality of "ghosts" may occur: some weak and some quite strong. Equalizers are used to interpret the broadcast signal and signals resulting from reflections or multipath propagation to reconstruct the transmitted signal. Equalizers must interpret these signals where the transmitted signal and its "ghosts" are of substantially the same signal strength, are of differing signal strengths, have a low time dispersion or have a severe time dispersion. Of course, high signal strength may be associated with low or severe time dispersion as may low signal strength.) In order to obtain a reliable transmission of information in spite of time dispersion it is well known to have equalizers at the receiving side in a mobile radio system. Depending upon design such an equalizer can handle shorter or longer time dispersion. One way to describe the ability of an equalizer to cope with time dispersion is to state the maximum time dispersion in microseconds the equalizer is designed for. Another way is to state how many symbol time spans the equalizer can cope with. The complexity, cost and power consumption of an equalizer increases progressively with the maximum time dispersion in microseconds and the number of symbol duration times. Accordingly there is an interest in designing a mobile radio system such that the requirements on the equalizers do not become too great and in particular not become greater than necessary. For the above mentioned pan european system GSM it has been decided that the equalizers shall be designed to cope with a maximum time dispersion of 16 microseconds, which corresponds to four symbol time intervals. In the above mentioned mobile radio system for the United States having both digital and analog radio channels the system should probably need to cope with a maximum time dispersion of about 60 microseconds on the digital radio channels, which is more than the duration of one symbol but less than the duration of two symbols.

The analog transmission of information on the analog radio channels of existing analog mobile radio systems, e.g. the above mentioned NMT or of the type existing in the USA, is normally substantially less sensitive than digital systems to reflections and multipath propagation causing dispersion on the digital radio channels.

BRIEF DESCRIPTION OF THE INVENTION

The complexity, cost and current consumption of equalizers increase progressively with the maximum time dispersion that an equalizer shall be able to handle or the number of symbol duration times the equalizer shall handle. This causes problems when designing mobile radio systems where a long time dispersion must be considered. The problems become particularly great when for various reasons it is not possible to choose certain parameters more or less freely, e.g. when desiring to successively change from analog technique to digital technique in a mobile radio system by successively replacing analog radio channels by time multiplexed digital radio channels. It can become particularly unfavorable if the time dispersion the system ought to successfully handle is substantially greater than a certain integer number of symbol time intervals but at the same time substantially less than the closest succeeding higher integer number of symbol time intervals. If then desiring to cope with the entire time dispersion by an Viterbi equalizer it is necessary to design the equalizer for the biggest one of the two integer numbers of symbol duration. The invention aims at solving this problem in a mobile radio system having both analog and digital radio channels.

Somewhat simplified one could say that the invention is based upon the idea to use the lower density of the analog radio channels for reflections and multipath propagation causing dispersion on the digital radio channels. The invention is also based on the understanding that the time dispersion on a particular radio channel in most cases is substantially less than the maximum time dispersion the system is to be designed for. Somewhat simplified it could the be said that according to the invention the equalizers are designed for a lower maximum time dispersion corresponding to the lower of the integer numbers of symbol time intervals and instead at least a temporary change over from a digital radio channel to an analog radio channel is done when the time dispersion on the used digital radio channel becomes greater than the maximum time dispersion the equalizer is designed for. Accordingly handover is done to an available analog radio channel. If there should be another available digital radio channel being sufficiently good the first choice is to attempt to use this by handover to such a digital radio channel. In such cases handover to an available analog radio channel is done only when there is no sufficiently good available digital radio channel.

It is possible but not always self evident to return to a digital radio channel by handover as soon as there is an available digital radio channel being sufficiently good.

In order to get to know in time when the dispersion on the used digital radio channel tends to become too severe the radio propagation properties of the used digital radio channel ought to be estimated more or less continuously. The estimation is preferably done by estimation of signal level and symbol error frequency, which can be performed in ways known per see. One method has been presented by Italtel within the framework on the pan european GSM system and is disclosed in a GSM paper titled GSM/WP2 doc 17/88. Based on the method suggested by Italtel Ericsson has suggested a method of measuring and transferring bit error rate information for the future U.S. digital cellular standard in a paper forwarded to the TIA Technical Subcommittee, TR-45 Digital Cellular Standards, meeting on Aug. 29, 1989 in San Diego, Calif.

The estimation of signal level and symbol error frequency is preferably performed at the mobile station which reports the estimation to its base station. This is in accordance both with the GSM standard and the TIA on digital cellular mobile radio systems.

Instead of estimating time dispersion indirectly by estimation of bit error rate and signal level the time dispersion may be estimated directly using receiver equalizer and synchronizing words transmitted on digital radio channels. Such direct estimation may use methods based on the contribution to the 38th IEEE vehicular technology conference held in Philadelphia, Pa., USA on 15-17 Jun., 1988, titled "Bit synchronization and timing sensitivity in adaptive viterbi equalizers for narrowband-TDMA digital mobile radio systems", by A. Baier, G. Heinrich, U. Wellens.

When possible it is preferred to perform a more or less continuous estimation also for at least on other digital radio channel than the channel presently used by the mobile. At least the radio propagation properties of at least one other possible digital radio channel shall be performed when the estimation of the radio propagation properties of the used digital radio channel indicates that the used digital radio channel is or tends to be too poor.

In order to increase the likelihood of successful handover to an analog radio channel the properties of the intended analog radio channel also ought to be estimated in an appropriate way, e.g. the expected signal level and/or the signal to noise ratio of the channel may be estimated. When this is difficult to accomplish at the mobiles it may be done at the base stations.

When introducing digital radio channels into a known mobile radio system with analog radio channels where decisions on handoff are done in the fixed part of the system and estimation of dispersion and other radio signal properties may also be done in the fixed part of the system the normal known handoff signalling procedure of the system for analog radio channels may be used. In a mobile radio system with a mobile assisted handoff procedure where at least some measurements or estimations are done at the mobile the procedure for handoff from a digital radio channel to an analog radio channel due to dispersion must include some signalling of results of measurements or estimations from mobile to base station.

THE DRAWINGS

FIG. 3 illustrates use of radio channels according to FIG. 2 for control channels, analog communication channels and time division multiplex digital communication channels in a cellular mobile radio system according to FIG. 1.

FIG. 5 illustrates a base station in a cellular mobile radio system according to FIG. 1 with radio channels used according to FIGS. 2 to 4.

DETAILED DESCRIPTION OF EMBODIMENTS

Figure 1:
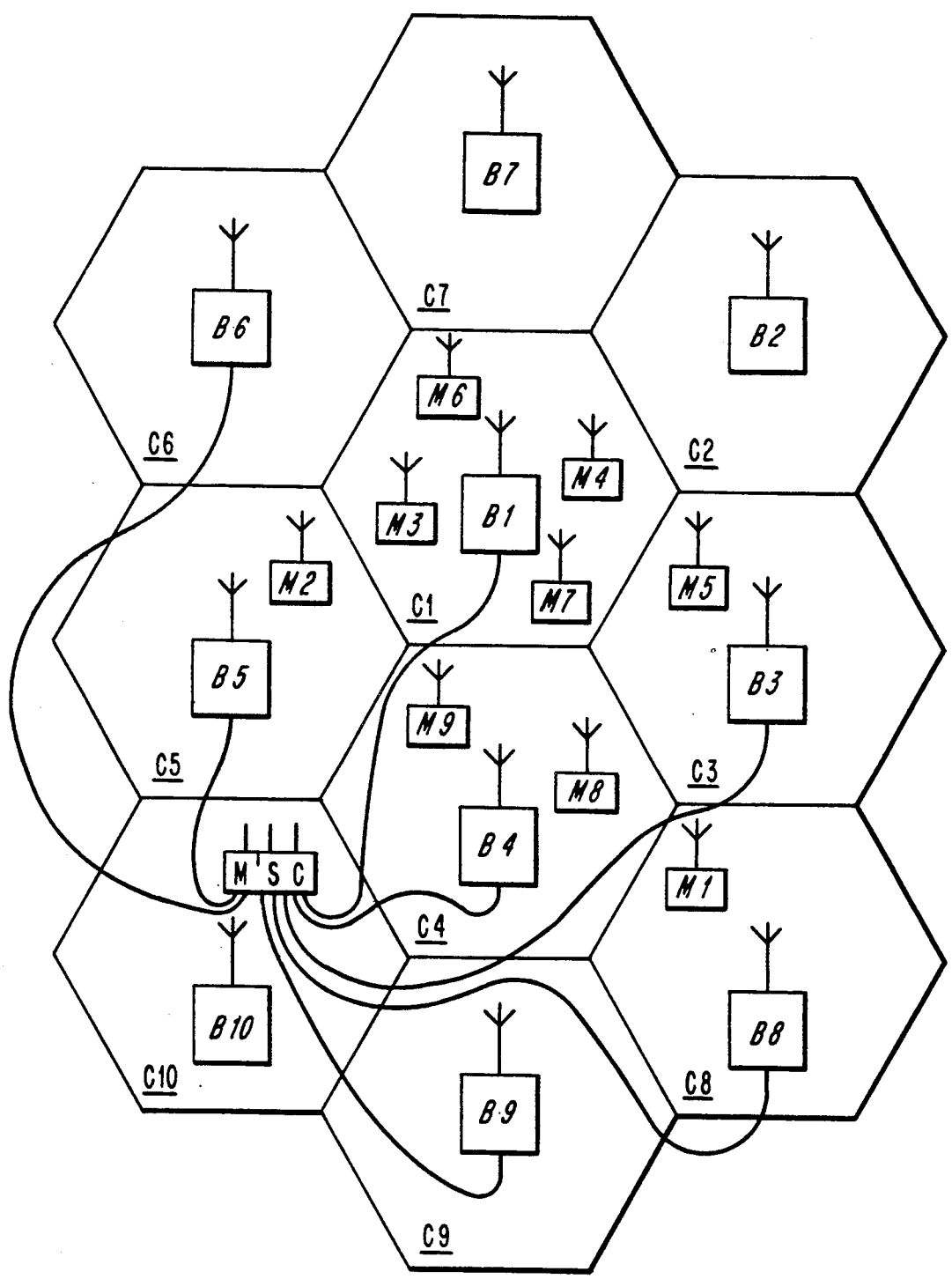
FIG. 1 illustrates part of a cellular mobile radio system with cells, a mobile switching center, base stations and mobile stations.

FIG. 1 illustrates ten cells C1 to C10 in a cellular mobile radio system. Normally a method according to the invention is implemented in a cellular mobile radio system comprising many more cells than ten. However, for the purpose of explaining the invention ten cells may be sufficient.

For each cell C1 to C10 there is a base station B1 to B10 with the same number as the cell. FIG. 1 illustrates base stations in the vicinity of cell center and having omnidirectional antennas. The base stations of adjacent cells may however be colocated in the vicinity of cell borders and have directional antennas as is well known to those skilled in the art.

FIG. 1 also illustrates ten mobile stations M1 to M10 within a cell and from one cell to another cell. Normally a method according to the invention is implemented in a cellular mobile radio systems comprising many more mobile stations than ten. However for the purpose of explaining the invention ten mobile stations may be sufficient.

Also illustrated in FIG. 1 is a mobile switching center MSC. The mobile switching center illustrated in FIG. 1 is connected to all ten illustrated base stations by cables. The mobile switching center is connected by cables also to a fixed public switching telephone network or similar network with ISDN facilities. All cables from the mobile switching center to base stations and cables to the fixed network are not illustrated.

In addition to the mobile switching center illustrated there may be another mobile switching center connected by cables to other base stations than those illustrated in FIG. 1. Instead of cables other means may be used for base to mobile switching center communication, e.g. fixed radio links.

The cellular mobile radio system illustrated in FIG. 1 comprises a plurality of radio channels for communication. The system is designated both for analog information, e.g. speech, digitized analog information, e.g. digitized speech, and pure digital information, e.g. pure data. In this application the term connection is used for a communication channel between a mobile station and another mobile station in the same system or another system or a fixed telephone or terminal in a fixed network connected to the cellular mobile radio system. Thus a connection may be a call where two persons talk to each other but may also be a data communication channel where computers exchange data.

Figure 2:
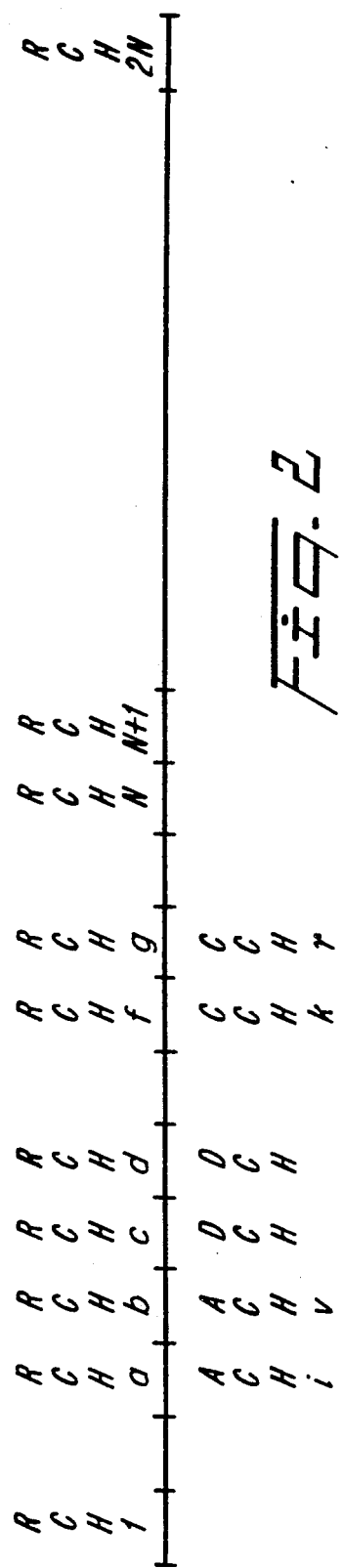
FIG. 2 illustrates a plurality of radio channels within a frequency band and use of some radio channels in a cellular mobile radio system according to FIG. 1.

FIG. 2 illustrates somewhat simplified a plurality of radio channels RCH1 to RCH2n within a frequency band. A first group of radio channels RCH1 to RCHN are used in the cellular mobile radio system for transmission of radio signals from base stations to mobile stations. A second group of radio channels RCHN+1 to RCHN2 are used in the cellular mobile radio system for transmission of radio signals from mobile stations to base stations.

Some of the radio channels are used for control channels. Normally each base station has at least one control channel. Normally a control channel is not used for transfer of information on a connection but for monitoring and control of mobiles during setup of a connection, maintaining as established connection and handoff of an established connection. In FIG. 3 is illustrated how the radio channel RCHf all the time is used for a control channel CCHk while the radio channel RCHg all the time is used for a control channel CCHr.

Some of the radio channels are used for analog communication channels. Normally analog communication are used for connections where analog information is exchanged, e.g. telephone calls where two persons talk to each other. Normally one analog communication channel is required for each such connection. When a radio channel is used for an analog communication channel the information on the connection is transmitted with analog modulated radio signals. In addition to the information on the connection the analog communication channel may also be used for associated information, e.g. a supervisory audio tone. In FIG. 3 is illustrated how the radio channel RCHa all the time is used for an analog communication channel ACHi while the radio channel RCHb all the time is used for an analog communication channel ACHv. Normally each base station has at least one radio channel used for analog communication channel.

Some of the radio channels are used for digital communication channels. Normally digital communication channels are used for connections where digital or digitized information is exchanged, e.g. data or digitized speech. The radio channels used for digital communication channels are divided into time slots and the time slots are grouped in frames. The time slots are allotted to digital communication channels whereby multiple digital channels share a common radio channel in time division multiplex. In FIG. 3 is illustrated a radio channel RCHc having three time slots in each frame F. A first of the time slots is allotted to the digital communication channel DCH4, a second of the time slots is allotted to the digital communication DCH5 and the third of the time slots is allotted to the digital communication channel DCH6. Thus the radio channel RCHc is used for three digital communication channels. FIG. 3 also illustrates how the radio channel RCHd is used for three digital communication channels DCH7, DCH8 and DCH9 in a corresponding way.

In FIG. 3 the frames F of radio channels RCHc and RCHd have three time slots. Depending on the required bandwidth of the various digital communication channels it is conceivable to have less slots in a frame, e.g. two slots, or to have more slots in frame, e.g. six slots. When the digital communication channels are used for connections where digitized speech is exchanged, six time slots may give too poor speech quality when the radio bandwidth is 30 kHz.

On a radio channel used for digital communication channels the base or mobile station transmits a time slot identifier code with the radio signals at least in every time slot used for a connection. On a particular radio channel, e.g. RCHc, the time slot identifier codes in different time slots are different. Thus the time slots identifier code T11 is transmitted in the first time slot of radio channel RCHc allotted to digital communication channel DCH4. The time slot identifier code T12 is transmitted in the second time slot of radio channel RCHc allotted to digital communication channel DCH5. The time slot identifier code T13 is transmitted in the third time slot assigned to digital communication channel DCH6.

The same time slot identifier codes may be used on two or more radio channels, possibly all radio channels. FIG. 3 illustrates how the time slot identifier T11 is transmitted in the first time slot of radio channel RCHd allotted to digital communication channel DCH7. The time slot identifier code T12 is transmitted in the second time slot of radio channel RCHd allotted to digital communication channel DCH8. The time slot identifier code T13 is transmitted in the third time slot of radio channel RCHd allotted to digital communication channel DCH9. Thus the time slot identifier code does not alone identify the channel but identifies the time slot in a frame. It is conceivable to have one set of time slot identifiers T11 to T13 for channels with three slot frames F and have a different set of time slot identifiers T14 to T9 for six slot frames whereby the time slot identifier also may indicate the number of slots in a frame of the radio channel.

On a radio channel used for digital radio channels also transmitted a digital voice color code with the radio signals at least in each time slot used for a connection. On a particular radio channel the same digital voice color code is transmitted with the radio signals in different time slots. FIG. 3 illustrates the transmission of the same digital voice color code VC1 in all time slots of the radio channel RCHc. Normally the same digital voice color code is used for all radio channels to and from a particular base station, e.g. the digital voice color code VC1 is used for all radio channels to and from base station BS1.

Some adjacent base stations may use the same digital voice color code e.g. base stations B2, B6 and B7 may use the same digital voice color code as long as base station BS1. Other base stations use a different digital voice color code, e.g. base stations B4, B5, B9 and B10 all use the digital color code VC4. Still other base stations use another different digital voice color code, e.g. base stations B3 and B8 use the digital voice color code VC7.

Figure 4:
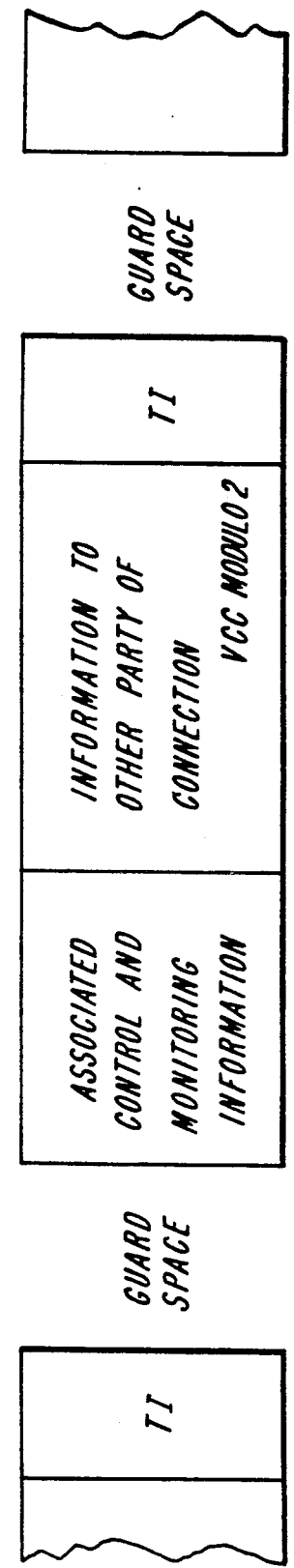
FIG. 4 illustrates bursts separated by guard spaces on a radio channel used for digital communication channels in time division multiplex according to FIG. 3 in a cellular mobile radio system according to FIG. 1.

The radio signals on a radio channel used for time division multiplex digital communication channels are transmitted in bursts. FIG. 4 illustrates a burst in a time slot separated by guard spaces from the end of the preceding burst and the beginning of a succeeding burst in adjacent time slots.

A transmitted burst comprises at least a time slot identifier, abbreviated TI, and a digital voice color code, abbreviated VC, and normally also information to be forwarded to the other party of the connection as well as connection or channel associated information for control or monitoring purposes.

It is well known to those skilled in the art that there is a need for receiver synchronization in time division multiple access radio communication systems. For this purpose it is well known to transmit synchronization words or patterns in each burst and to transmit particular frame synchronization words or patterns from a master or base station to a slave or mobile station. Preferably the time slot identifier code according to the present invention may also be used for synchronization of receiver to transmitter. Selecting time slot identifier codes in this way means that the implementation of time slot identifier codes according to the present invention does not require any dedicated bits for the time slot identifier. Theoretically, there exist a number of uncorrelated binary multi bit words, e.g. 26 bit words, which may be used as different synchronization words. According to the present invention one unique time slot identifier and synchronization words is required for each time slot in a frame on the channel. For the purpose of both time slot identification and synchronization the time slot identifier code words are to be chosen for minimum correlation between each other and between themselves except for correlation to themselves in phase. Thus a first time slot identifier code used to identify the first time slot of a frame according to the present invention and to synchronize receiver to transmitter shall exhibit low correlation to an identical code when substantially out of phase but exhibit high correlation to an identical code when substantially in phase. A second time slot identifier code used to identify the second time slot of a frame and to synchronize receiver to transmitter shall also be exhibit low correlation to an identical code when out of phase but exhibit high correlation to an identical code when substantially in phase. All other time slot identifiers used on the channel should also exhibit low correlation to an identical code when out of phase but exhibit high correlation to an identical code when in phase. Any time slot identifier code used on the channel should also exhibit low correlation to any other time slot identifier code used on the channel irrespective of phase relationship, i.e. of in phase or out of phase. Once the requirements on time slot identifier codes are given one skilled in the art will be able to select proper time identifier codes without inventive activity. However, for the convenience of those not skilled in the art the following eight 26 bit words are given as examples of possible time slot identifier codes for an eight slot frame:

code for time slot 1:
(0,0,1,0,0,1,0,1,1,1,0,0,0,0,1,0,0,0,1,0,0,1,0,1,1,1,)
code for time slot 2:
(0,0,1,0,1,1,0,1,1,1,0,1,1,1,1,0,0,0,1,0,1,1,0,1,1,1,)
code for time slot 3:
(0,1,0,0,0,0,1,1,1,0,1,1,1,0,1,0,0,1,0,0,0,0,1,1,1,0,)
code for time slot 4:
(0,1,0,0,0,1,1,1,1,0,1,1,0,1,0,0,0,1,0,0,0,1,1,1,1,0,)
code for time slot 5:
(0,0,0,1,1,0,1,0,1,1,1,0,0,0,1,0,0,0,0,0,0,1,1,0,1,0,1,1,)
code for time slot 6:
(0,1,0,0,1,1,1,0,1,0,1,1,0,0,0,0,0,1,0,0,1,1,1,0,1,0,)
code for time slot 7:
(1,0,1,0,0,1,1,1,1,1,0,1,1,0,0,0,1,0,1,0,0,1,1,1,1,1,)
code for time slot 8:
(1,1,1,0,1,1,1,1,0,0,0,1,0,0,1,0,1,1,1,0,1,1,1,1,0,0,)

When there are less than eight time slots in a frame on the radio channel less than all of the given code words may be used. However there may be advantages in using other than the given code when there are only three time slots in a frame.

It of course conceivable to use binary time slot identifier codes having more or less than 26 bits. Longer code words offer some advantages but has the disadvantage of occupying more of the available space in a burst.

In the advanced mobile phone service system, abbreviated AMPS, there is a supervisory audio tone, abbreviated SAT, transmitted e.g. on analog communication channels. The reason for transmitting the SAT in AMPS is that in an interference limited mobile radio communication network there should be some means for the receiving entity (e.g. base station) to identify the transmitting entity (e.g. mobile station) or at least with high likelihood exclude interchange of transmitter entity without the need for continuous transmission of transmitter identity. The object of the digital channel code in a cellular mobile radio system according to the present invention is at least partly the same as that of SAT in AMPS. The number of different SATs is three in AMPS. The number of different digital voice color codes in a cellular mobile radio system according to the present invention is preferably much higher than three, mainly to support a proper introduction of discontinuous transmission. The number of different digital color codes should be high enough to guarantee that cells where the same radio channels are used having the same color code ar at a geographical distance from each other sufficient not to cause co-channel interference. In case discontinuous transmission is used the disturbing signal of another station should not significantly exceed the level of noise. For this purpose an eleven bit color code seems quite sufficient in normal cases. However, the longer color codes the longer connection setup and handoff procedures. Considering the possible load on control channels eight bit digital voice codes seems to be a good compromise. Preferably the digital voice channel code is binary word having eight bits, enabling theoretically 256 different voice color codes.

A separate digital voice color code requires space in a burst thus reducing the space available for speech or data on the connection. However, the following implementation of voice code does not require any dedicated bits for the digital voice code in a burst on a digital communication channel.

At the transmitting side the digital voice color code is added bit by bit modulo two to a field under error detection but without error correction within the information part of the burst after channel coding. On the receiving side the bursts in the time slots are deinterleaved and checked. This check is done by adding bit by bit the known digital voice color code modulo two, as is done at the transmitting side, before channel decoding and error detection. If no error is found after adding the digital voice color code modulo two the information part of the burst was sent from the expected transmitter and not from an interferer.

FIG. 5 illustrates a base station in a cellular mobile radio system according to FIG. 1 with radio channels according to FIGS. 2 to 4. The base station is designed for transmission and reception on a plurality of radio channels used for digital communication channels, analog communication channels and control channels. In FIG. 5 not all base station equipment for all channels is illustrated. Normally a base station has equipment for more channels, in particular analog communication channels, as well as other equipment for power supply, maintenance etc but the illustrated equipment is believed sufficient for the understanding of the present invention.

The base station is connected to a mobile switching center by six trunks. A first incoming trunk for digital communication channels is connected to a digital trunk demultiplexer and interface DMU-D. A second incoming trunk for analog communication channels is connected to an analog trunk interface and demultiplexer DMU-A. A third incoming trunk for control channels and base station control information is connected to a trunk interface and control information demultiplexer DMU-C. A first outgoing trunk for digital communication channels is connected to a digital multiplexer and trunk interface MUX-D. A second outgoing trunk for analog communication channels is connected to an analog multiplexer and trunk interface MUX-A. A third outgoing trunk for control channels and base station information is connected to a control information multiplexer and trunk interface MUX-C.

For each of the outgoing radio channels used for digital communication channels the base station comprises digital analog channel coding means, DCC, connected to a digital trunk demultiplexer and interface, DMU-D, modulo two adding means, M2A, burst generation means, BG, modulator means, MOD, and power amplification means, PA, connected to an antenna. Two such outgoing radio channels share a digital voice color code means, VCS, connected to their modulo two adding means. Two such outgoing radio channels also share a time slot identifier code means, TIS, connected to their burst generators.

For each of the outgoing radio channels used for analog communication channels the base station comprises analog transmission channel processing means, ATC, connected to an analog trunk interface and demultiplexer, DMU-A, modulator means, MOD, and power amplification means, PA, connected to an antenna.

For each of the outgoing radio channels used for control channels the base station comprises outgoing control channel processing means, CTC, connected to the trunk interface and control information demultiplexer, DMU-C, modulator means, MOD, and power amplification means, PA, connected to an antenna.

For each incoming radio channel used for digital communication channels the base station comprises radio receiver means, REC, connected to an antenna, radio signal strength or level measuring means, SLM, analog to digital conversion means, A/D, multipath equalizer and burst synchronizing and time slot recognition and automatic frequency control means, EQ-AFC, modulo two adding means, M2A and digital channel decoder means, DCD, connected to a digital multiplexer and trunk interface, MUX-D.

Two incoming radio channels used for digital communication share digital voice color code means, VCS, connected to their modulo two adding means. Two such incoming radio channels also share digital channel bit error measuring means, BEM, connected to their digital channel decoders, DCD.

For each incoming radio channel used for analog communication channels the base station comprises radio receiver means, REC, connected to an antenna, radio signal strength or level measuring means, SLM, and incoming analog channel processing means, ARC, connected to an analog multiplexer and trunk interface, MUX-A.

For each incoming radio channel used for control channel the base station comprises radio receiver means, REC, connected to an antenna, radio signal strength or level measuring means, SLM, and incoming control channel processing means, CRC, connected to the control information multiplexer and trunk interface, MUX-C.

All modulation means and radio receiver means are connected to frequency synthesizer means, FS. The frequency synthesizer means are controlled by a central processor, CP. The CP also controls the DCCs, VCSs, BGs, EQ-AFCs, DCDs, BEM, ATC, ARC, CTC, CRC and MUX-C. Preferably the central processor is not the only processor in the base station but other means may also comprise processors, in particular the ATC, ARC, CTC, CRC and EQ-AFCs.

The base station according to FIG. 5 is intended for communication with mobile station only having equipment for analog communication channels and control channels. The base station is also intended for communication with mobile stations only having equipment for digital communication channels and control channels.

The base station is also intended for communication with dual mode mobile stations designed for communication on both analog and digital communication channels as well as channels.

Mobile stations designed only for analog communication channels may be of a kind well known to those skilled in the art and operate according to AMPS standard. Furthermore, a method according to the invention can only be implemented with mobile stations with means for communication both on digital and on analog radio channels. Accordingly there is no need for disclosing a mobile designed only for analog radio channels or its operation here. Neither is there any need for describing parts of a dual-mode mobile station used only for communication on analog radio channels and control channels.

Figure 6:
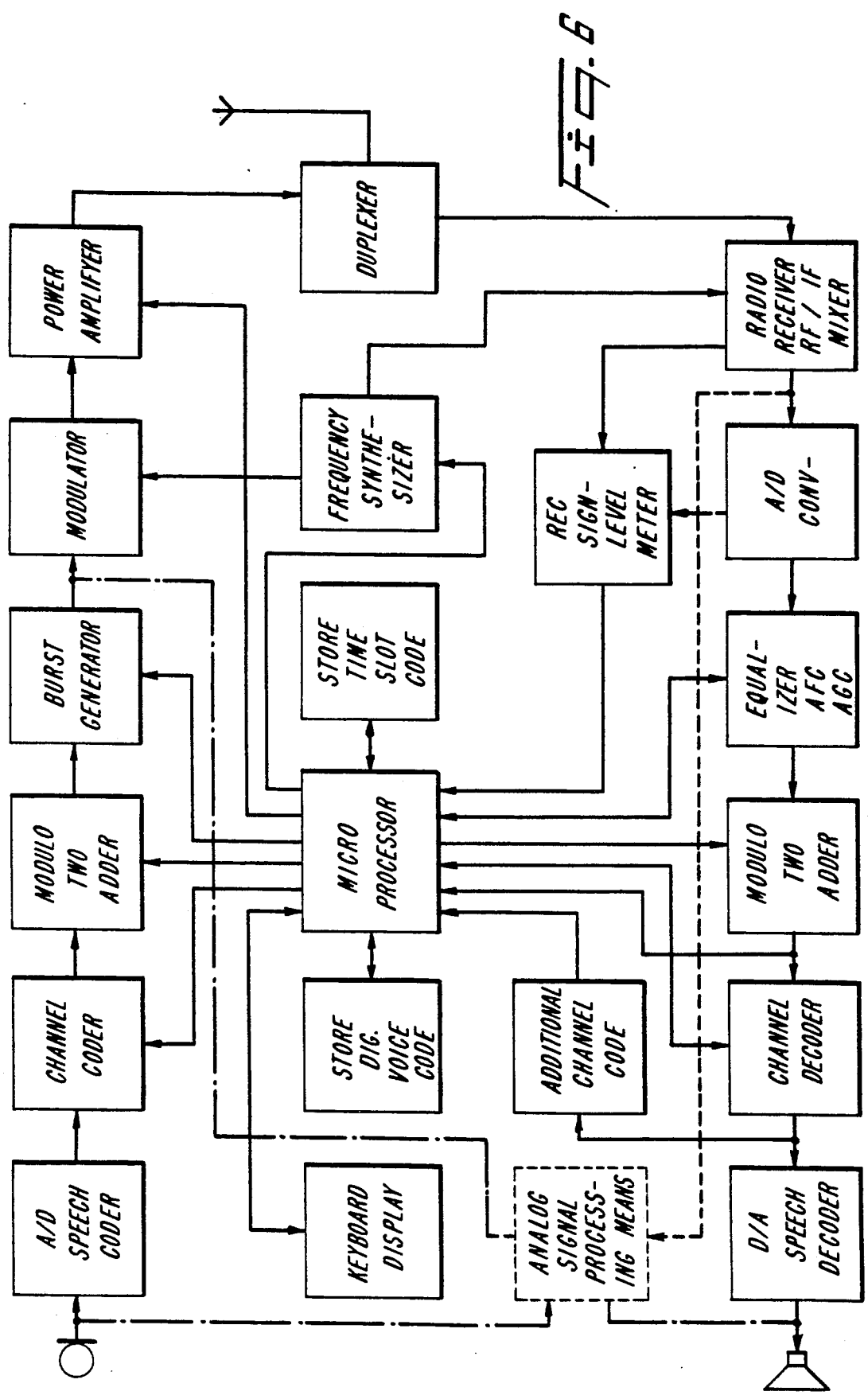
FIG. 6 illustrates a mobile station in a cellular mobile radio system according to FIG. 1 for communication with a base station according to FIG. 5 on control and digital communication channels according to FIGS. 2 to 4.

FIG. 6 illustrates parts of a dual-mode mobile station in a cellular radio system according to FIG. 1 for communication with a base station according to FIG. 5 on radio channels according to FIGS. 2 to 4. The parts illustrated are involved in communication on digital radio channels. A dual mode mobile station capable of using both analog and digital radio channels thus includes in addition to the means illustrated in FIG. 6 first analog signal processing means connected to the microphone and the modulator and second analog signal processing means connected to the radio receiver IF stage and to the loudspeaker. The first and second analog signal processing means are merely indicated by one block and are controlled by the microprocessor.

The mobile station comprises a microphone connected to analog to digital speech coding means for coding speech or sound into a binary code with a bitrate or bandwidth less than 11 kHz. preferably about 7 to 8 kHz. Connected to the speech coding means is channel coding means for interleaved error protecting coding of the digital information from the speech coder. The channel coder is connected to a modulo two adder for modulo adding of a digital voice color code to the digital information from the channel coder. The modulo two adding means are connected to a burst generator for collecting information to be transmitted in a burst and arranging the information including time slot identifier code into a proper burst. When the mobile is used for data transmission on a connection or during connection setup the burst generator puts data and/or control information in the burst instead of digitized speech. Such information may be supplied from a keyboard via a microprocessor and the channel coder or directly from the microprocessor. A modulator is connected to the burst generator for receiving digital information to be modulated on a radio frequency carrier from as frequency synthesizer and be amplified in a power amplifier. The modulation method used may be continuous phase modulation or other types suitable for digital information transmission. The power amplifier is connected to an antenna via a duplex and is controlled from the microprocessor.

The mobile station also comprises a radio receiver connected to the duplexer, a radio signal or level means and analog to digital conversion means. The radio receiver comprises RF and IF stages with filter, demodulator etc. Means for equalizing the digital communication channel and automatic frequency control and automatic gain control are connected to the radio receiver and the input of a modulo two adder. The modulo two adder adds a digital voice color code modulo two to the digital information from the equalizer. The modulo two adder output is connected to a channel decoder for deinterleaving and error detection and correction of digital information from the modulo two adder. Means for converting digital information to analog information or speech are connected to the channel decoder and a loudspeaker.

When the mobile station is tuned to a radio channel used by a base station for control channel some of the illustrated equipment of the mobile station is not used, in particular not channel and speech decoder. When control and monitoring information is transmitted from the base station on the control channel according to the AMPS standard the microprocessor receives and interprets signals from the analog to digital converter.

Except for the time slot identifier and the digital voice color code and means for introducing, recognizing and removing them from the flow of information the mobile radio according to FIG. 6 may operate on time division multiplex digital communication channels in a way similar to known digital mobile radio stations, e.g. of the kind disclosed in the GSM standard or in Ericsson Review No. 3, 1987.

Accordingly there is no need here to further describe in detail the overall operation or the detailed operation of the various means. Regarding the time slot identifier code and the digital color code the mobile station comprises means for storing all possible time slot identifier codes and digital voice color codes to be used in communication with a base station. The microprocessor receives instructions from the base as to which codes to use in the particular connection and reads the codes from the stores and supplies the modulo two adders and burst generator with appropriate time slot identifier code and digital voice color code.

Figure 7:
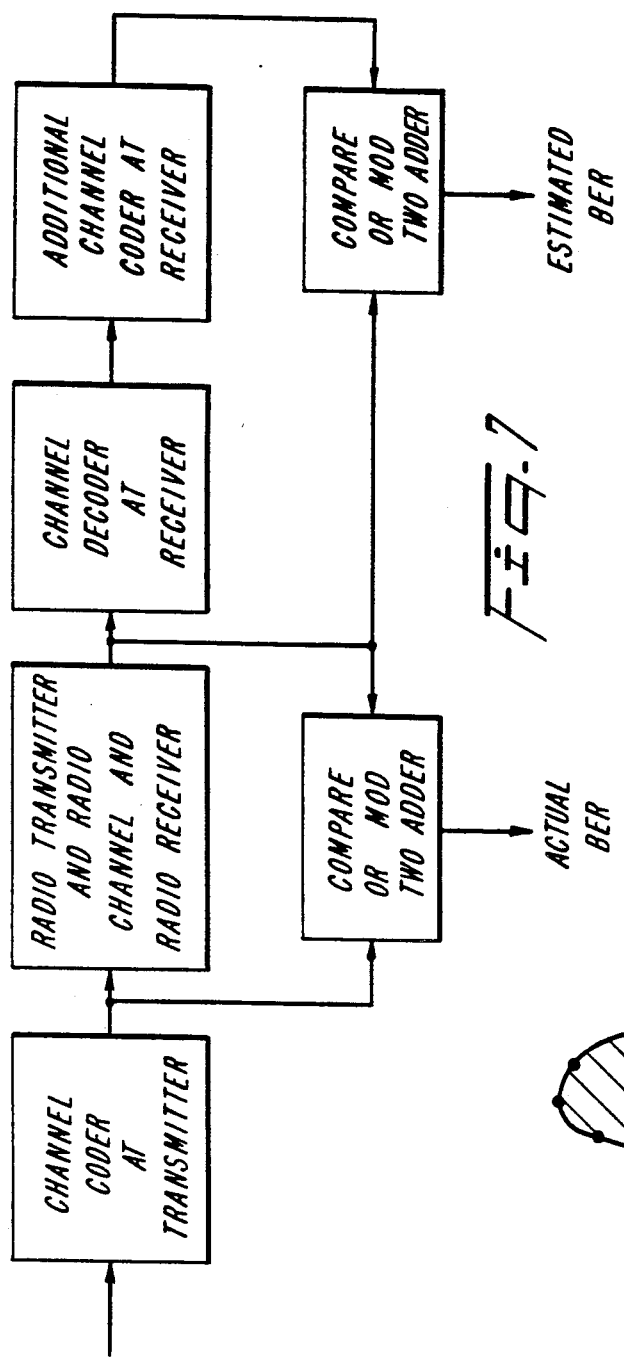
FIG. 7 illustrates actual error rate and estimation of error rate on a digital channel by using additional channel coder at the receiving side of a base or mobile station.

When receiving radio signals from a base station synchronization and recognition of time slot identifier is performed in the equalizer in cooperation with the microprocessor. Measurement of bit error rate on an established connection is performed in the channel decoder in cooperation with the microprocessor. Equalizers and methods of synchronization and bit error measurement are well known to those skilled in the art. Accordingly there is no need here to further describe such methods or means for performing them. However for the person not skilled in the art a brief explanation on bit error measurement for digital radio channels will be given in connection with FIG. 6 and 7.

In this example it is assumed that at least a part of the digital information transmitted on the digital radio channel is protected by an error correction code. As an example, both the GSM and TIA systems use 20 ms speech blocks with part of the speech coder output bits protected by an error correction code. Since the speech coder operates block wise so does the error correction applied. The actual bit error rate, BER, of the radio channel including certain transmitting and receiving means at base and mobile station is of course due to the difference between the information actually leaving the channel coder of the transmitter and the information received by the receiver decoder. This is illustrated in the left hand part of FIG. 7. An estimate of the actual bit error rate can be done by reencoding the decoded data in the receiver and comparing this bit stream with the input to the channel decoder of the receiver. This is illustrated in a principal way in the right hand part of FIG. 7. For the purpose of this an additional channel encoder may be used and in FIG. 6 an additional encoder has been incorporated in the receiving part of the mobile station. Corresponding additional encoder means may of course be incorporated in the receiving part of a base station according to FIG. 5. For comparing corresponding digital symbols according to FIG. 7 the central processor in the base station and the microprocessor of the mobile station may be used.

If the channel decoder in the receiver has corrected all bit errors in a block of n bits then the bit by bit comparison of the received data with the reencoded data will be equal to the actual number of bit errors in the block of n bits. The number of bit errors is the number of different bit values in the above mentioned comparison. Thus, in this case the estimated number of bit errors is equal to the true value of bit errors. The bit error rate in the block of n bits is then the number of bit differences divided by n.

If the channel decoder of the receiver is not capable of reproducing the transmitted n bits e.g. the channel decoder makes an error, the estimated bit error rate will not be equal to the actual error rate. Nevertheless, for bit error rates in the range of interest the estimate will be highly correlated to the actual rate. The difference between the estimated and actual rate can be seen as a measurement noise term. The system is intended to operate with a radio link quality where most of the blocks can be corrected by the channel decoder, otherwise the audio quality would be unintelligible, thus the measurement noise is limited. If the radio link quality is so low that almost every block is uncorrectable by the channel decoder, the output from the decoder is more or less a random pattern with low correspondence with the received block. This can for instant happen if the amount of time dispersion is much more than the equalizer can handle. The important thing is that the bit error estimate will still cause a generally correct conclusion, i.e. too low radio channel quality, because the difference between two blocks with almost no correspondence will result in that, in average, every second bit comparison will indicate a bit error. Thus the bit error rate will be estimated to be 50%.

In summary, independent of the radio link quality this method described will indicate to the receiver the quality of the radio link in terms of a bit error estimate.

The procedure for connection setup in a cellular mobile radio system according to FIG. 1 with a base station according to FIG. 5 and a mobile station according to FIG. 6 may be similar to the corresponding procedure in AMPS when the channel to be used is an analog communication channel. However, when the channel to be used for the connection is a digital communication channel according to FIGS. 3 and 4 the base station informs the mobile station not only on radio channel but also on time slot and digital voice color code to be used. During the setup procedure the base station then also informs the mobile station on a plurality of radio channels the signal strength on which to be measured by the mobile. Normally this plurality of radio channels are the radio channels used for channels by adjacent bases/cells. Depending upon the movement of the mobiles as well as other circumstances a new plurality of radio channels may be selected and corresponding information be transmitted to the mobile from the responsible base station during the course of the connection. During the course of a connection for which a digital communication channel is used the mobile measures the signal strength of signals on the given plurality of radio channels. Measurements may be done during time slots not used by the digital communication channel. The mobile station also measures signal strength on the digital communication channel used for the established connection and the bit error rate on the established connection. The mobile station transmits results of its measurements, preferably averaged, frequently to the base station, preferably twice a second.

In addition to or instead of measuring signal strength and bit error rate the mobile station may estimate time dispersion on the used digital radio channel using the time slot identifier code words and the equalizer in a way to be described later. The mobile station may transmit the estimation in addition to or instead of signal level or bit error rate measurement results frequently to the base station.

The base station also measures signal strength on the digital communication channel used for established connection and the bit error rate on the established connection. The base station may also estimate time dispersion on incoming radio channels used for digital communications channels. This may be done using the time slot identifier codes and equalizer in a way to be described later. The base station processes and analyzes the results of its own measurements and/or time dispersion estimates and the measurement and/or time dispersion estimates of the mobile and compares with criteria for handoff. When according to the results and criteria a handoff to another base station is desirous the base station informs the mobile switching center indicating at least one target base station assumed suitable for taking over the responsibility for the communication with the mobile.

The mobile switching center request the target base station(s) to measure signal strength on a radio channel in a time slot used by the mobile for the established connection. The mobile switching center also informs the target base station on the digital color code used by the mobile station.

The target base station(s) tune (s) a receiver to the radio channel indicated by the mobile switching center and uses the time slot identifier of the indicated time slot for burst synchronization. The target base station checks the appearance of the digital color code indicated by the mobile switching center and measures the signal strength of the burst signals provided the digital color code is correct. The target base station then transmits its results of signal strength measurement to the mobile switching center. The target base station also informs the mobile switching center on the result of the checking of the appearance of the digital color code, that is whether the digital voice color code appeared in the burst in the time slot of the radio channel.

The mobile switching center determines whether handoff to a target base should be performed taking the results of signal strength measurements of target base(s) into account as well as other circumstances, e.g. traffic load.

When the mobile switching center determines that handoff to an other base station and digital radio channel shall be performed it transmits to responsible base and target information on new radio channel, new time slot and new voice color code to be used by the mobile station for the connection after handoff and new radio channel to be used by target base station for the connection after handoff.

The responsible base station forwards information about the two new radio channels, new time slot and new digital color code to the mobile. After receiving this information the mobile station tunes to the new radio channel to be used for the connection by the target base station and looks for the new time slot identifier code in received signals on the radio channel. The mobile station uses the new time slot identifier code in received signals for burst synchronization. After synchronization and tuning its transmitter to the new radio channel the mobile station begins transmitting bursts in the new time slot on the new radio channel. The new digital color code is transmitted with each burst.

The target base station tunes a receiver to the new channel to be used for the connection by the mobile station and looks for the new time slot identifier code. The target base station uses the time slot identifier code for synchronization. The target base station then looks for the new digital color code in signals in the new time slot of the new channel. If the target base station identifies the new digital color code in the bursts in the new time slot of the new radio channel this is reported to the mobile switching center. The mobile switching center then interprets the handoff as successful and acts accordingly. After successful handoff the former target base station now being responsible base station informs the particular mobile station on a new plurality of radio channels the signal strength on which to be measured by the mobile.

In the embodiment of the handoff method described above the responsible base station and mobile station use the same time slot identifier code and the same digital voice color code. However, it is conceivable to use different time slot identifier at base and mobile stations for a particular connection.

In the embodiment of the handoff method described the mobile station measures signal strength on radio channels used for control by base station. However, it is conceivable to request mobile station to measure signal strength on radio channels used for digital communication channels by base station, in particular when there are no radio channels entirely used for control channels by base stations.

The procedure for intracell handoff from a digital radio channel to an analog radio channel of the same base station is of course less complex than the described handoff procedure because responsible base station and target base station is the same. When according to the results and criteria a handoff from a digital radio channel to an analog radio channel is desirous the base station informs the mobile switching center. After approval by the mobile switching center the base station may perform the normal procedure of the system for intracell handoff to a new analog radio channel, the procedure comprising transmitting informing to the mobile station on the new radio channel to be used. If the invention is implemented in a mobile radio system where handoff between analog channels is performed according to the AMPS standard the this procedure may also be used for handoff from digital to analog handoff due to time dispersion. If the invention is implemented in a mobile radio system where handoff between analog channels is performed according to an other standard then this procedure may also be used for handoff from digital to analog channel due to time dispersion. Accordingly there is no need for describing a complete such a procedure here. Suffice it to say that there is no transmission of information on time slot identifier code or digital voice color codes from base to mobile but instead information on supervisory audio tones or similar means may be transmitted from base to mobile.

The procedure for handoff from a digital channel of one base station to an analog channel of an other base station is of course a little more complex than the intracell handoff procedure because more than one base station is involved. However, the normal procedure of the system for handoff to a new base station and a new analogue channel may be used, the procedure comprising transmitting information to the mobile station on new base station and new analog channel. If the invention is implemented in a mobile radio system with analog channel handover according to the AMPS standard then this procedure may be used. If the invention is implemented in a system with different handover procedure then this handoff procedure is well known to those skilled in the art. Anyone not skilled in the art of procedures for analog channel handover is recommended to study the specifications on the NMT and AMPS systems or the specification of the system where the invention is to be implemented and possibly also published patents in the field of handover. Accordingly there is no need for describing such a handover procedure here.

The intelligence and decision making in a mobile cellular system according to FIG. 1 may be more or less centralized to the mobile switching center or more or less decentralized to the base stations. In a decentralized system more or less of the functions of the mobile switching office during the handoff preparation and performance may instead be performed in the responsible and/or target base stations.

A method of directly estimating time dispersion and determining when the time dispersion is too big will now be described in connection with FIGS. 6 and 8.

The signals from the A/D converter in FIG. 6 are sampled a number, j, of times per bit time. In the equalizer the received signals are correlated with the locally stored time slot identifier. In this way an estimate $Y(t)$ of the channel impulse response is calculated in the equalizer and made available for processing and equalization in the central processor. In FIG. 8 the absolute values of $Y(t)$ are indicated as a function of time. The distance between adjacent indicated values of $Y(t)$ is the symbol (bit) time, T, divided by j. A process of estimating the impulse response is described in detail in the earlier cited article "Bit synchronization and timing sensitivity in adaptive Viterbi Equalizers for Narrowband-TDMA Mobile Radio Systems". Accordingly for a further understanding of FIG. 8 reference is made to this article.

Figure 8:
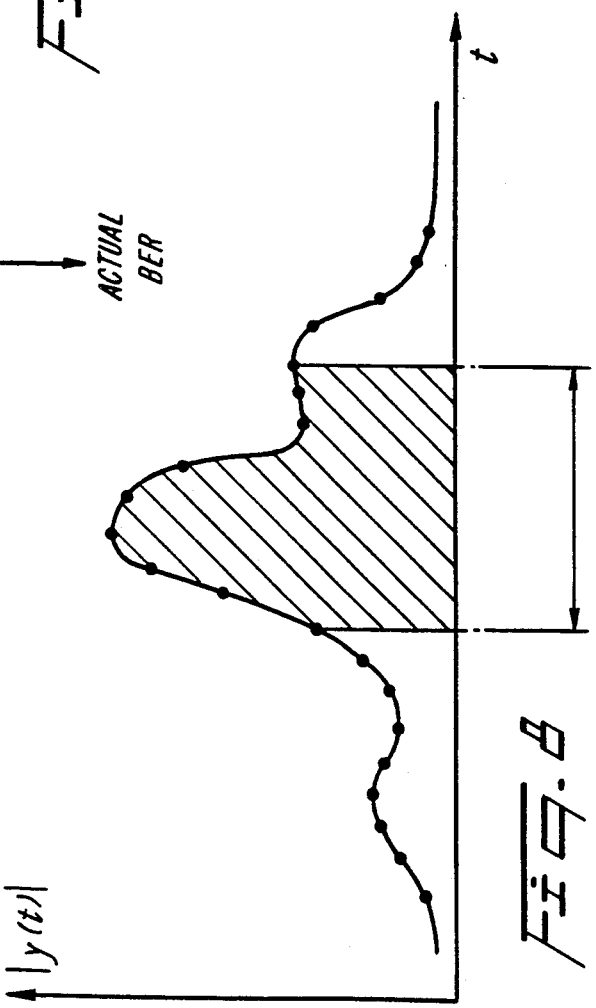
FIG. 8 illustrates impulse response of digital channel radio link including transmission and receiving means and estimation of time dispersion on a digital channel using synchronization words.

The equalizer correlates the received signal with the time slot identifier TSID over a movable time span Wt, hereafter called the measurement window, which is indicated in FIG. 8. The length of the measurement window represent the amount of time dispersion that the equalizer can handle e.g. energy within the measurement window contributes in a positive manner for the demodulation/bit detection process whereas energy outside this window act as an interfering signal. The length of the gliding window is a design parameter in the construction of the equalizer. With a long window the equalizer can handle more time dispersion but the complexity and power consumption will increase.

The equalizer moves the gliding window in relation to the impulse response, calculates the impulse energy inside and places the window in such a position in relation to the impulse response that the part of the energy, c, inside the window is maximized. This part of the impulse inside the window is shadowed in FIG. 8. Maximizing the part of the energy inside means that the impulse energy, r, outside the measurement window is minimized. The positioning of the movable window is further elaborated in the above mentioned reference. The estimation of the impulse response is an inherent feature of the equalizer. Depending on the equalization algorithm used, the impulse response may be estimated only once in each burst, as described above, but may also be updated during the duration time of the burst. Thus, the central processor may obtain at least once every burst the amount of useful energy, c, and the interfering energy, r, from the equalizer.

The receiver processor can now average the individual c and r values over a plurality, n, of bursts so that influence of estimation errors, short time variations of radio propagation properties etc is reduced. The averaged quantities of c and r are denoted C and R respectively. Since C represents useful energy and R represents disturbing energy the C/R ratio thus represents a figure of merit of the ability of the equalization to reproduce the transmitted data in a way similar to the well known S/N ratio used for telecommunication in general.

If the C/R ratio is low the bit error rate will be high. An criteria that can be used to determine if the time dispersion is too severe to enable reproduction of an audio signal or data transmitted is to make the processor comparing the C/R with a threshold, K. Thus if C/R is less than K, the processor has determined that the time dispersion is so big that problem with the time dispersion currently exists.

Of course the described method of estimation of time dispersion on a digital radio channel can be done either at the base station or at the mobile station or at both. The invention is not limited to the use of this particular method but decisions to handover to an other channel may be based on other methods of estimation of time dispersion.

We claim:

1. In a multi-channel mobile radio system comprising a base station and a mobile station designed both for digital transmission of information using digitally modulated radio signals on a digital radio channel and for analog transmission of information using analog-modulated radio signals on an analog radio channel, which mobile station comprises an equalizer designed for a particular maximum time dispersion of digitally modulated radio signals, a method of maintaining a connection started on the digital radio channel comprising the steps of:

estimating time dispersion of the digital radio channel used by the mobile radio station for the connection; and comparing the estimated time dispersion with criteria for handoff to an available analog radio channel and when the estimated time dispersion corresponds to the criteria for handoff, transmitting to the mobile station information on the available analog radio channel and performing handoff of the connection to the available analog radio channel.

2. A method according to claim 1, comprising the further steps of:

estimating time dispersion of a possible digital radio channel available to the mobile station during the time the connection continues on the analog radio channel; and comparing the estimated time dispersion of the possible digital radio channel with criteria for handoff to the possible digital radio channel and when the estimated time dispersion corresponds to the criteria for handoff to the possible digital radio channel, transmitting to the mobile station information on the possible digital radio channel and performing handoff of the connection to the possible digital radio channel.

3. The method of claim 2 wherein the digital radio channel, the analog radio channels and the possible digital radio channel are of different frequencies.

4. The method of claim 1 wherein the digital radio channel and the analog radio channels are of different frequencies.

5. In a multi-channel mobile radio system comprising a base station and a mobile station designed both for digital transmission of information using digitally modulated radio signals on a digital radio channel and for analog transmission of information using analog-modulated radio signals on an analog radio channel, which mobile station comprises an equalizer designed for a particular maximum time dispersion of digitally modulated radio signals, a method of maintaining a connection comprising the steps of:

estimating radio propagation properties of the digital radio channel used by the mobile radio station for an ongoing connection; and comparing the estimated radio propagation properties with criteria for handoff from the digital radio channel and when the estimated radio propagation properties correspond to the criteria for handoff, transmitting to the mobile station information on an available analog radio channel and performing handoff of the connection to the available analog radio channel.

6. A method according to claim 5, comprising the further steps of:

estimating radio propagation properties of a possible digital radio channel available to the mobile station during the time the connection continues on the analog radio channel; and comparing the estimated radio propagation properties of the possible digital radio channel with criteria for handoff to the possible digital radio channel and when the estimated radio propagation properties of the possible digital radio channel correspond to the criteria for handoff to the possible digital radio channel, transmitting to the mobile station information on the possible digital radio channel and performing handoff of the connection to the possible digital radio channel.

7. The method of claim 6 wherein the digital radio channel, the analog radio channels and the possible digital radio channel are of different frequencies.

8. The method of claim 5 wherein the digital radio channel and the analog radio channels are of different frequencies.

9. In a multi-channel mobile radio system comprising a base station and a mobile station designed both for digital transmission of information using digitally modulated radio signals on a digital radio channel and for analog transmission of information using analog-modulated radio signals on an analog radio channel, which mobile station comprises an equalizer designed for a particular maximum time dispersion of digitally modulated radio signals, a method of maintaining a connection comprising the steps of:

estimating radio propagation properties of a first digital radio channel used by the mobile radio station for an ongoing connection;

estimating radio propagation properties of a second digital radio channel available to the mobile station;

comparing the estimated radio propagation properties of the first and second digital radio channels and when the estimated radio propagation properties of the first and second digital radio channels correspond to criteria for handoff to the second digital radio channel, transmitting to the mobile station information on the second digital radio channel and performing handoff of the connection to the second digital radio channel; and when the estimated radio propagation properties of the first and second digital radio channels do not correspond to the criteria for handoff to the second digital radio channel, estimating the radio propagation properties of an analog radio channel available to the mobile radio station and comparing the estimated radio propagation properties of the first digital radio channel and the analog radio channel with criteria for handoff to the analog radio channel, and when the estimated radio propagation properties of the first digital radio channel and the analog radio channel correspond to criteria for handoff to the analog radio channel, transmitting to the mobile station information on the analog radio channel and performing handoff of the connection to the analog radio channel.

10. A method according to claim 9, comprising the further steps of:

estimating the radio propagation properties of a possible digital radio channel available to the mobile station during the time the connection continues on the analog radio channel; and comparing the estimated radio propagation properties of the possible digital radio channel with criteria for handoff to the possible digital radio channel and when the estimated radio propagation properties of the possible digital radio channel correspond to the criteria for handoff to the possible digital radio channel, transmitting to the mobile station information on the possible digital radio channel and performing handoff of the connection to the possible digital radio channel.

11. The method of claim 10 wherein the first digital radio channel, the second digital radio channel, the analog radio channels and the possible digital radio channel are of different frequencies.

12. The method of claim 9 wherein the first digital radio channel, the second digital radio channel and the analog radio channels are of different frequencies.

13. In a multiple channel mobile radio system comprising a base station and a mobile station designed both for digital transmission of information using digitally modulated radio signals on any of a plurality of digital radio channels and for analog transmission of information using analog-modulated radio signals on any of a plurality of analog radio channels, which mobile station comprises an equalizer designed for a particular maximum time dispersion of digitally modulated radio signals, a method of maintaining a connection comprising the steps of:

estimating a signal level and bit error rate of a first digital radio channel used by the mobile radio station for an ongoing connection;

estimating radio propagation properties of a second digital radio channel available to the mobile station;

comparing the estimated signal level and bit error rate of the first digital radio channel and the estimated radio propagation properties of the second digital radio channel and, when the estimated signal level and bit error rate of the first digital radio channel and the estimated radio propagation properties of the second digital radio channel correspond to criteria for handoff to the second digital radio channel, transmitting to the mobile station information on the second digital radio channel and performing handoff of the connection to the second digital radio channel; and when the estimated signal level and bit error rate of the first digital radio channel and the estimated radio propagation properties of the second digital radio channel do not correspond to the criteria for handoff to the second digital radio channel, estimating the radio propagation properties of an analog radio channel available to the mobile radio station and comparing the estimated radio propagation properties of the first digital radio channel and the analog radio channel with criteria for handoff to the analog radio channel and when the estimated radio propagation properties of the first digital radio channel and the analog radio channel correspond to criteria for handoff to the analog radio channel, transmitting to the mobile station information on the analog radio channel and performing handoff of the connection to the analog radio channel.

14. A method according to claim 13, comprising the further steps of:

estimating radio propagation properties of a possible digital radio channel available to the mobile station during the time the connection continues on the analog radio channel;

comparing the estimated radio propagation properties of the possible digital radio channel with criteria for handoff to the possible digital radio channel and when the estimated radio propagation properties of the possible digital radio channel correspond to the criteria for handoff to the possible digital radio channel, transmitting to the mobile station information on the possible digital radio channel and performing handoff of the connection to the possible digital radio channel.

15. The method of claim 14 wherein the first digital radio channel, the second digital radio channel, the analog radio channel and the possible digital radio channel are of different frequencies.

16. The method of claim 13 wherein the first digital radio channel, the second digital radio channel and the analog radio channel are of different frequencies.

17. In a mobile radio system having a mobile station and a base station having use of analog radio channels and digital radio channels subject to time dispersion whereby signal intelligence is smeared over a wider time interval during the course of transmission, a method of maintaining a connection established on a digital radio channel, comprising the steps of:

determining when time dispersion on said digital radio channel exceeds a predetermined maximum acceptable time dispersion; and transmitting to the mobile station, when the time dispersion of said digital radio channel exceeds the predetermined maximum acceptable time dispersion, information on an available analog channel, and performing handoff of the connection to the available analog channel.

18. The method of claim 17 wherein said determining step comprises estimating said time dispersion of said digital radio channel at said mobile station and reporting estimates to said base station.

19. The method of claim 17 wherein said digital radio channel is an uplink channel and said determining step comprises the base station estimating said time dispersion of said digital radio channel.

20. The method of claim 17 wherein the digital radio channel and the analog radio channel are of different frequencies.

21. In a multi-channel mobile radio system comprising a base station and a mobile station designed both for digital transmission of information using digitally modulated radio signals on a digital radio channel and for analog transmission of information using analog modulated radio signals on an analog radio channel, which mobile station comprises an equalizer designed for a particular maximum time dispersion of digitally modulated radio signals, a method of maintaining a connection started on the digital radio channel comprising the steps of:
    estimating time dispersion of the digital radio channel used by the mobile radio station for the connection;
    estimating radio propagation of an analog radio channel available to the mobile station; and
    comparing the estimated time dispersion and radio propagation properties with criteria for handoff to the available analog radio channel and when the estimated time dispersion and radio propagation properties correspond to the criteria for handoff, transmitting to the mobile station information on the available analog radio channel and performing handoff of the connection to the available analog radio channel.

22. The method of claim 21 wherein the digital radio channel and the analog radio channels are of different frequencies.

23. A method according to claim 21, comprising the further steps of:
    estimating time dispersion of a possible digital radio channel available to the mobile station during the time the connection continues on the analog radio channel; and
    comparing the estimated time dispersion of the possible digital radio channel with criteria for handoff to the possible digital radio channel and when the estimated time dispersion of the possible digital radio channel substantially corresponds to the criteria for handoff to the possible digital radio channel, transmitting to the mobile station information on the possible digital radio channel and performing handoff of the connection to the possible digital radio channel.

24. The method of claim 23 wherein the digital radio channel, the analog radio channels and the possible digital radio channel are of different frequencies.

25. In a multi-channel mobile radio system comprising a base station and a mobile station designed both for digital transmission of information using digitally modulated radio signals on a digital radio channel and for analog transmission of information using analog-modulated radio signals on an analog radio channel, which mobile station comprises an equalizer designed for a particular maximum time dispersion of digitally modulated radio signals, a method of maintaining a connection comprising the steps of:
    estimating radio propagation properties of the digital radio channel used by the mobile radio station for an ongoing connection;
    estimating radio propagation properties of an analog radio channel available to the mobile radio station; and
    comparing the estimated radio propagation properties of the digital radio channel and the available analog radio channel with criteria for handoff from the digital radio channel to the available analog radio channel and when the estimated radio propagation properties of the digital radio channel and the available analog radio channel correspond to the criteria for handoff, transmitting to the mobile station information on the available analog radio channel and performing handoff of the connection to the available analog radio channel.

26. The method of claim 25 wherein the digital radio channel and the analog radio channels are of different frequencies.

27. A method according to claim 25, comprising the further steps of:
    estimating radio propagation properties of a possible digital radio channel available to the mobile station during the time the connection continues on the analog radio channel; and
    comparing the estimated radio propagation properties of the possible digital radio channel with criteria for handoff to the possible digital radio channel and when the estimated radio propagation properties of the possible digital radio channel correspond to the criteria for handoff to the possible digital radio channel, transmitting to the mobile station information on the possible digital radio channel and performing handoff of the connection to the possible digital radio channel.

28. The method of claim 27 wherein the digital radio channel, the analog radio channels and the possible digital radio channel are of different frequencies.

29. In a multi-channel mobile radio system comprising a base station and a mobile station designed both for digital transmission of information using digitally modulated radio signals on a digital radio channel and for analog transmission of information using analog-modulated radio signals on an analog radio channel, which mobile station comprises an equalizer designed for a particular maximum time dispersion of digitally modulated radio signals, a method of maintaining a connection comprising the steps of:
    estimating ratio propagation properties of a first digital radio channel used by the mobile radio station for an ongoing connection;
    estimating radio propagation properties of a second digital radio channel available to the mobile station;
    comparing the estimated radio propagation properties of the first and second digital radio channels and when the estimated radio propagation properties of the first and second digital radio channels correspond to criteria for handoff to the second digital radio channel, transmitting to the mobile station information on the second digital radio channel and performing handoff of the connection to the second digital radio channel; and when the estimated radio propagation properties of the first and second digital radio channels do not correspond to the criteria for handoff to the second digital radio channel, transmitting to the mobile station information on an available analog radio channel and performing handoff of the connection to the analog radio channel.

30. The method of claim 29 wherein the first digital radio channel, the second digital radio channel and the analog radio channels are of different frequencies.

31. In a multi-channel mobile radio system comprising a base station and a mobile station designed both for digital transmission of information using digitally modulated radio signals on any of a plurality of digital radio channels and for analog transmission of information using analog-modulated radio signals on any of a plurality of analog radio channels, which mobile station comprises an equalizer designed for a particular maximum time dispersion of digitally modulated radio signals, a method of maintaining a connection comprising the steps of:

estimating a signal level and bit error rate of a first digital radio channel used by the mobile radio station for an ongoing connection;

estimating the radio propagation properties of a second digital radio channel available to the mobile station;

comparing the estimated signal level and bit error rate of the first digital radio channel and the estimated radio propagation properties of the second digital radio channel and when the estimated signal level and bit error rate of the first digital radio channel and the estimated radio propagation properties of the second digital radio channel correspond to criteria for handoff to the second digital radio channel, transmitting to the mobile station information on the second digital radio channel and performing handoff of the connection to the second digital radio channel; and when the estimated signal level and bit error rate of the first digital radio channel and the estimated radio propagation properties of the second digital radio channel do not correspond to the criteria for handoff to the second digital radio channel, transmitting to the mobile station information on an available analog radio channel and performing handoff of the connection to the analog radio channel.

32. The method of claim 31 wherein the first digital radio channel, the second digital radio channel and the analog radio channel are of different frequencies.

* * * * *